United States Patent [19]
Tanaka

[11] Patent Number: 5,797,053
[45] Date of Patent: Aug. 18, 1998

[54] APPARATUS AND METHOD FOR FEEDING FILM HAVING PERFORATIONS INCLUDING JUDGING WHETER A FILM TIP HAS PASSED A DETECTOR

[75] Inventor: Yoshiharu Tanaka, Sakai, Japan

[73] Assignee: Minolta Co., Ltd., Osaka, Japan

[21] Appl. No.: 790,599

[22] Filed: Jan. 29, 1997

[30] Foreign Application Priority Data

Jan. 31, 1996 [JP] Japan .................................. 8-016169

[51] Int. Cl.$^6$ .................................................. G03B 1/18
[52] U.S. Cl. ........................ 396/397; 396/408; 396/409
[58] Field of Search ........................ 396/387, 395, 396/397, 406, 407, 408, 409, 410, 392; 348/96, 105; 352/92, 241

[56] References Cited

U.S. PATENT DOCUMENTS

| | | | |
|---|---|---|---|
| 5,278,600 | 1/1994 | Takahashi et al. | 396/515 |
| 5,321,455 | 6/1994 | Cocca | 396/390 |
| 5,347,334 | 9/1994 | Smart et al. | 396/515 |
| 5,659,830 | 8/1997 | Cocca | 396/392 |

*Primary Examiner*—Safet Metjahic
*Assistant Examiner*—J. K. Han
*Attorney, Agent, or Firm*—Burns, Doane, Swecker & Mathis, LLP

[57] ABSTRACT

An apparatus comprises a feeder for feeding the film, a detector for detecting perforations formed on the edge of the film, a controller for controlling the feeder based on the output from the detector. In the apparatus, the operation of the detector is inhibited after the beginning of film feeding until the tip of the film has passed in front of the detector to prevent the erroneous detection of the perforations.

8 Claims, 10 Drawing Sheets

APPARATUS AND METHOD FOR FEEDING FILM HAVING PERFORATIONS INCLUDING JUDGING WHETER A FILM TIP HAS PASSED A DETECTOR

BACKGROUND OF THE INVENTION

1. Field of the Invention

The present invention pertains to a camera that performs photo-taking and to a film reader that performs reproduction, both using a film cartridge created for new systems.

2. Description of the Related Art

The film employed in these new systems is housed completely inside a film cartridge which is described in, for example, U.S. Pat. No. 5,347,334. This film cartridge is cylindrical, and in its center is rotatably located a spool to perform film feeding and rewinding.

A film outlet having a light blocking door that can open and close is located on a side surface of the cartridge. Therefore, the camera that employs this film cartridge needs to have a drive mechanism to carry out rotation of said spool and perform opening and closing of said light blocking door.

Further, one edge of said film contains perforations indicating photo image formation areas. Therefore, the camera that uses this film performs control to convey the photo image area to a prescribed photo-taking position by detecting the perforations using a sensor.

The film used in new systems has a notch formed at the tip of the film, separately from said perforations. This notch operates to prevent the film from rotating inside the film cartridge when it is housed inside the cartridge, and is formed by cutting out the film to a depth that corresponds to the center of the perforation, as measured across the width of the film. In addition, the width of the tip of the film on which this notch is formed is made narrower than the rest of the film. As a result, when film is fed out from the film cartridge, the film tip may slide in a direction perpendicular to the direction of film feeding, resulting in inconsistency and errors in the detection of the notch using the sensor used for detecting the perforations. Consequently, when it is attempted to position the first photo image area on the film, the number of perforations cannot be accurately counted, and the desired photo image area on the film cannot be accurately aligned with the photo-taking lens.

SUMMARY OF THE INVENTION

The present invention was designed in consideration of these problems. Its main object is to provide an apparatus that employs film having information recording areas using which erroneous detection of the notch by the perforation detection sensor may be prevented.

In order to attain said object, the apparatus of the present invention is equipped with a feeding means for feeding the film a detecting means for detecting perforations formed on the edge of the film, a control means for controlling the feeding means based on the output from the detecting means, a judging means for judging whether or not the tip of the film has passed in front of the detecting means, and an inhibiting means for inhibiting the operation of said detecting means between the beginning of film feeding and the passage of the film tip.

Further, in order to attain said object, the apparatus of the present invention in use of a film stored in a cartridge is equipped with a spool, a feeder which feeds the film from the cartridge toward the spool, a sensor which is located to face the edge of the film and outputs signal corresponding apertures formed on the film, a control means for stopping the operation of the feeder when a change in the output of the sensor is detected, a detector which detects the arrival of the film at the spool, and a preventing means for preventing the operation of the sensor between the beginning of film feeding and the detection by the detector of the arrival of the film tip at the spool.

Further, in order to attain said object, a camera of the present invention in use of a film stored in a cartridge is equipped with a feeding means for feeding out the film from the cartridge, a first sensor which is located to face the film on the upstream side of a photo-taking position in the direction of film feeding, a second sensor which is located to face the film on the downstream side of the photo-taking position in the direction of film feeding, a first preventing means which prevents the detecting operation by the first sensor between the beginning of film feeding and the detection of a change in the output of the second sensor, a second preventing means which prevents the detecting operation by the second sensor between the detection of a change in the output of the second sensor and the detection of a change in the output of the first sensor, and a control means for stopping the operation of the feeding means when a change in the output of both the first and second sensors is detected.

These and other object, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

In FIG. 6, (A) is a plan view showing one part of the film used in a new system, and (B) is a timing chart showing the detection signals from photointerrupters PI1 and PI2.

In FIG. 7, (A) is an illustration showing the construction of the important parts of the camera of embodiment 2 of the present invention, in which the film is wound around a winding member, and (B) is a simplified illustration showing the construction of important parts as well as the control block of the film conveyance device of the camera of embodiment 2 of the present invention.

DETAILED DESCRIPTION OF THE PREFERRED EMBODIMENTS

The embodiments of the present invention will be described below with reference to the drawings.

(Embodiment 1)

Figure 1:
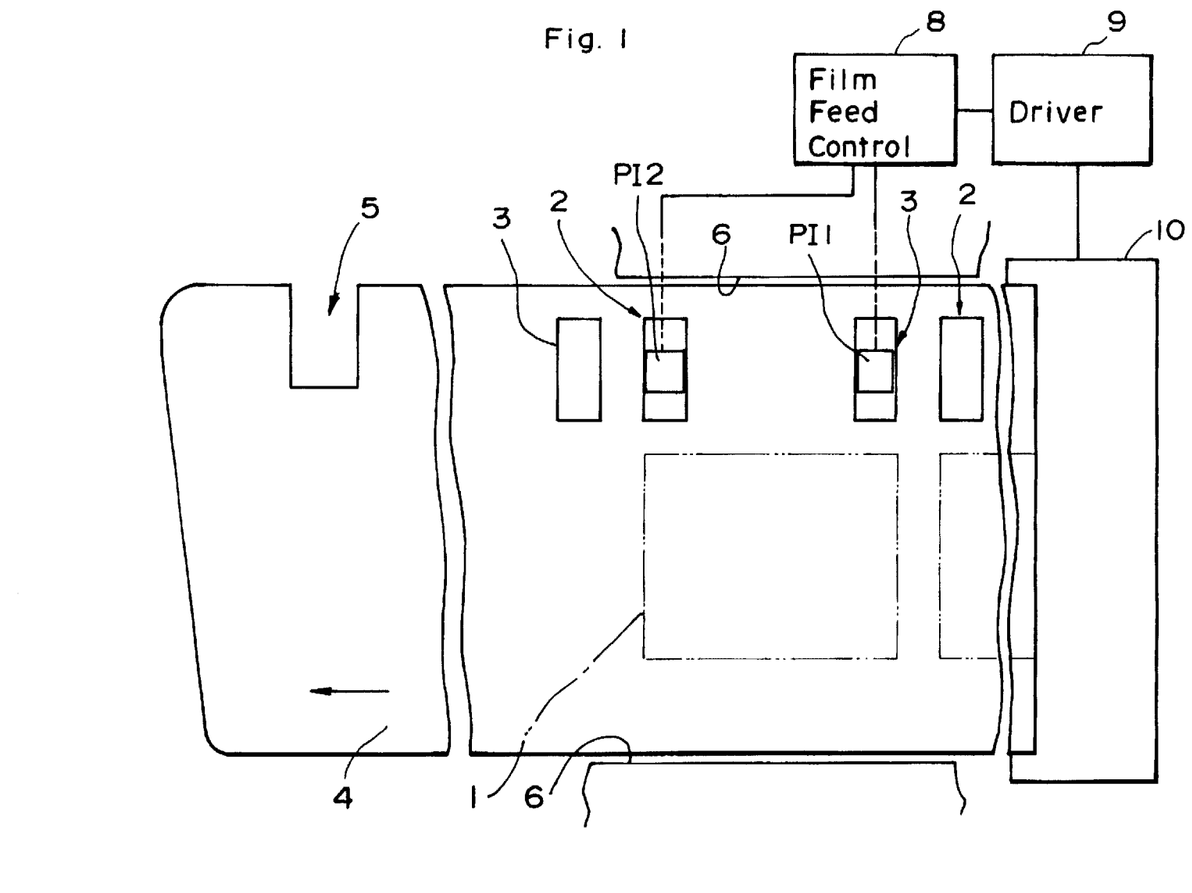
FIG. 1 is an illustration showing the construction of the important parts as well as the control block of the film conveyance device of the camera of embodiment 1 of the present invention.

FIG. 1 is an illustration showing the construction of the important parts as well as the control block of the film conveyance device of the camera of embodiment 1 of the present invention.

As shown in FIG. 1, film 4 is housed in cartridge 10 in a wound-up state. Photo image area 1 is formed in the center of film 4 across its width. Perforations 2 and 3, which are openings that have an identical configuration and that sequentially determine the lengthwise positions of these photo image areas 1, are located along one edge of film 4 (the upper edge in the drawing). In other words, perforations 2 are located along the film edge at positions corresponding to the front edges of photo image areas 1 positioned in the center of film 4 as determined by the direction of film feeding. Perforations 3 are located along the film edge at positions corresponding to the back edges of photo image areas 1 positioned in the center of film 4 as determined by the direction of film feeding. Notch 5 that comprises a cut-out is formed at the tip of the film on the edge in which these perforations 2 and 3 are located. The positional relationship between these perforations 2 and 3 and notch 5 is regulated in accordance with the new systems. The distance of this notch 5 from the edge of the film is substantially shorter than the distances, as also measured from the edge of the film, of perforations 2 and 3 located at the front edge of the first photo image area 1.

Photointerrupters PI1 and PI2 that consist of sensors for the detection of perforations 2 and 3 and the closed-off (non-opening) areas of film 4 are located in conveyance path 6 of film 4. When film 4 is in position for possible phototaking, photointerrupter PI1 is located at a position in film conveyance path 6 facing the center of perforation 3 that comprises a first opening, and photointerrupter PI2 is located at a position in film conveyance path 6 facing the center of perforation 2 that comprises a second opening. As described above, photointerrupters PI1 and PI2 are positioned so that they face the centers of perforations 2 and 3 whose locations correspond to the prescribed position of photo image area 1 for phototaking.

Film conveyance control means 8 outputs drive control signals to drive means 9 having a film conveyance motor and drive circuit for said motor, based on detection signals from photointerrupters PI1 and PI2. Based on these drive control signals, drive means 9 feeds or rewinds the film by rotating or stopping spool 10a (see FIG. 3) of film cartridge 10. Here, because notch 5's depth from the edge of film 4 is not aligned with perforations 2 and 3, detection by means of photointerrupters PI1 and PI2 is inconsistent. As described below, this film conveyance control means 8 ignores the detection signals that are output when notch 5 passes photointerrupters PI1 and PI2, comprising first and second sensors, based on a difference in the output timing of photointerrupters PI1 and PI2 due to their different locations. It then outputs a drive control signal to drive means 9 based on subsequent sensor output.

Figure 2:
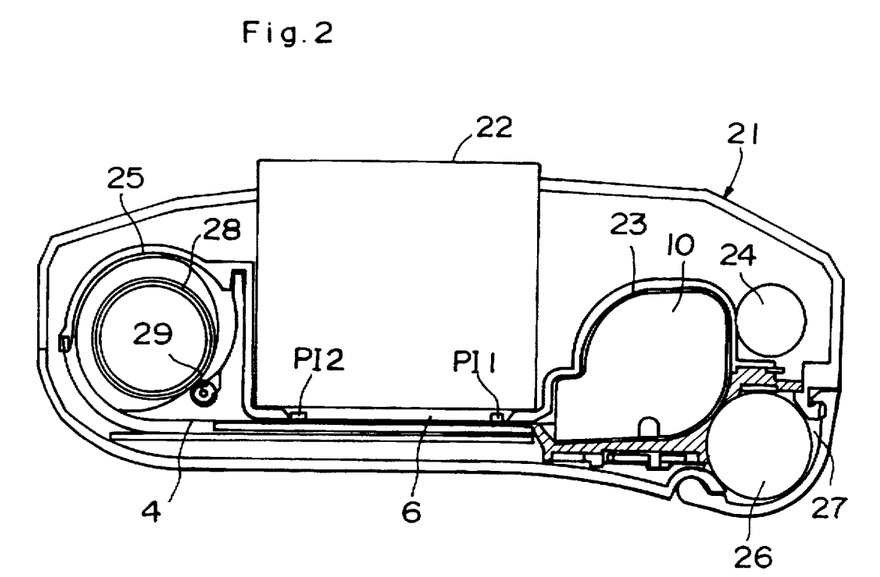
FIG. 2 is a transverse cross-sectional view of the camera body of embodiment 1 of the present invention.

The camera of this embodiment 1 will be explained in further detail below. FIG. 2 is a transverse cross-sectional view of the camera body of embodiment 1 of the present invention. In FIG. 2, camera body 21 includes photo-taking lens unit 22 that is located more or less in its center and has a photo-taking lens, cartridge bay 23 located to the right of photo taking lens unit 22 in the drawing and in which film cartridge 10 is housed, film conveyance motor 24 that is located to the right of this cartridge bay 23 and that performs feeding and rewinding of film 4, winding spool compartment 25 that is located to the left of photo-taking lens unit 22, and battery compartment 27 that houses battery 26 and is located at the bottom right portion of the camera.

Cartridge bay 23 contains a forked axle (not shown in the drawings) that engages with spool 10a of film cartridge 10 (see FIG. 3) and rotates spool 10a. Winding spool compartment 25 contains rotatable cylindrical winding spool 28 and film presser 29 that comprises a cylindrical roller (or a metal spatula-shaped member instead of a roller) that is located parallel to the axis of winding spool 28, as well as a spring, such that said presser 29 may come into contact with the surface of winding spool 28 with a prescribed pressure. Motor 24 is connected to the forked axle inside cartridge bay 23 and to winding spool 28 by means of a drive force transmission mechanism not shown in the drawings and comprising gears, etc. Said forked axle and winding spool 28 are driven to rotate forward or backward by film conveyance motor 24.

Photointerrupters PI1 and PI2 that consist of optical sensors to detect said perforations 2 and 3 are located in concave areas formed in the camera body housing between photo-taking lens unit 22 and film 4 and in film conveyance path 6, said photointerrupters PI1 and PI2 being a prescribed distance from each other.

Figure 3:
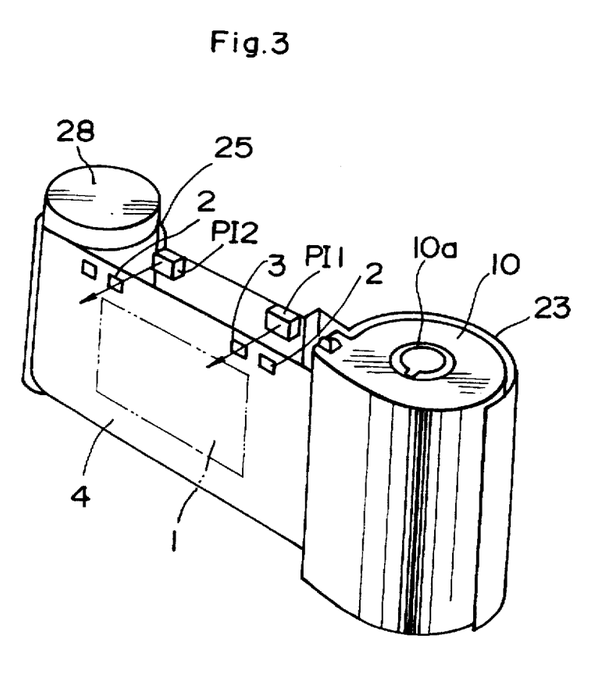
FIG. 3 is a perspective view showing in a simplified fashion the positional relationship between the film and the photointerrupters in FIGS. 1 and 2.

FIG. 3 is a perspective view showing in a simplified fashion the positional relationship between film 4 and photointerrupters PI1 and PI2 shown in FIGS. 1 and 2.

Film cartridge 10 is housed in cartridge bay 23, which is located in the camera body which comprises the housing. Rotatable cylindrical winding spool 28 is located in winding spool compartment 25, and film 4 fed from film cartridge 10 is wound around winding spool 28. At this point in time, photo image area 1, the lengthwise dimension of which is defined by perforations 2 and 3 comprising prescribed openings formed on one edge of film 4, is positioned at a prescribed photo-taking position between film cartridge 10 and winding spool 28 and behind photo-taking lens unit 22. Photointerrupters PI1 and PI2 that comprise opening detection sensors are placed at appropriate locations on the housing such that they face the positions past which travel perforations 2 and 3 on film 4, and such that when film 4 is in the photo-taking position, photointerrupter PI1 faces perforation 3 and photointerrupter PI2 faces perforation 2.

Figure 4:
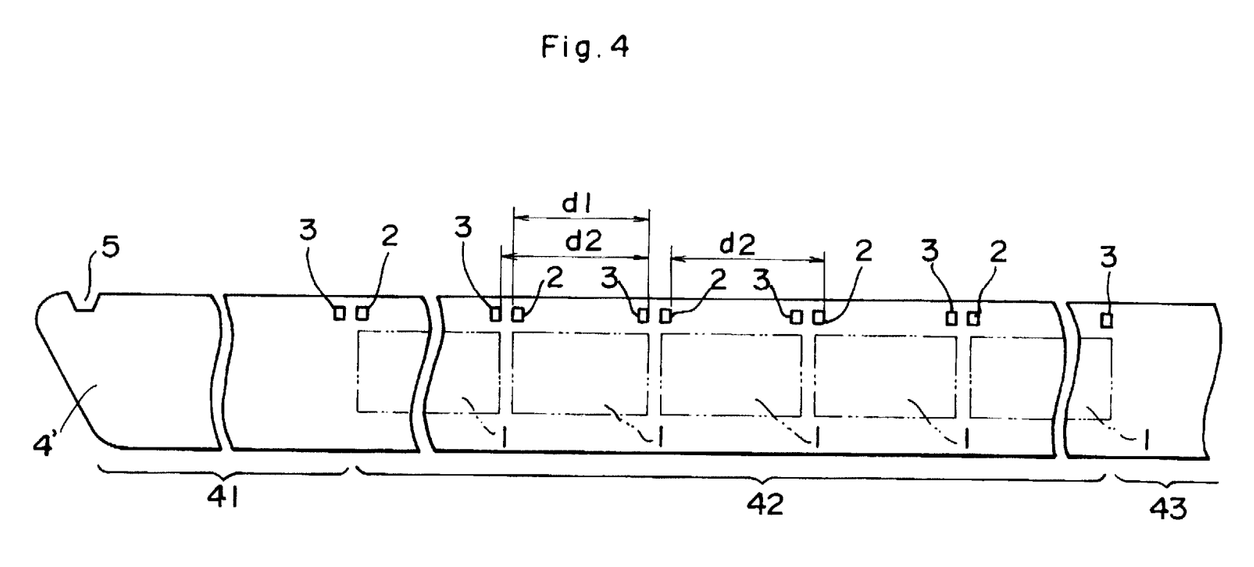
FIG. 4 is a plan view of the film used in a new system.

FIG. 4 is a plan view of film 4 described above.

This film 4 is divided, from the tip of said film, into the three areas of leader 41, exposure area 42 and tail 43. This leader 41 is a lead part used to pull out film 4 from the film cartridge. Exposure area 42 is an area on which photo-taking of a prescribed number of photographs may be taken using frames aligned at prescribed intervals, and this area contains a prescribed number of photo image areas 1. Tail 43 is an area to permit the pulling out of film 4 from the film cartridge by a prescribed amount or more to allow exposure onto the final photo image area in exposure area 42.

Notch 5, which is a cut-out to prevent rotation of the film inside the film cartridge, is located at an appropriate location on the tip of film 4 on its upper edge relative to the direction of film feeding. Along this upper edge are located perforations 2 and 3 that consist of identical rectangular openings, comprising pairs that are formed at regular intervals, and photo image areas 1 used for photo-taking are sequentially located between the perforations 2 and 3 that have a relatively wider distance between them. The distance between perforations 2 and 3 that form a pair is set at prescribed dimension d1, while the distance between adjacent perforations 2 or 3 is set at prescribed dimension d2, such that they are formed at regular intervals.

Figure 5A:
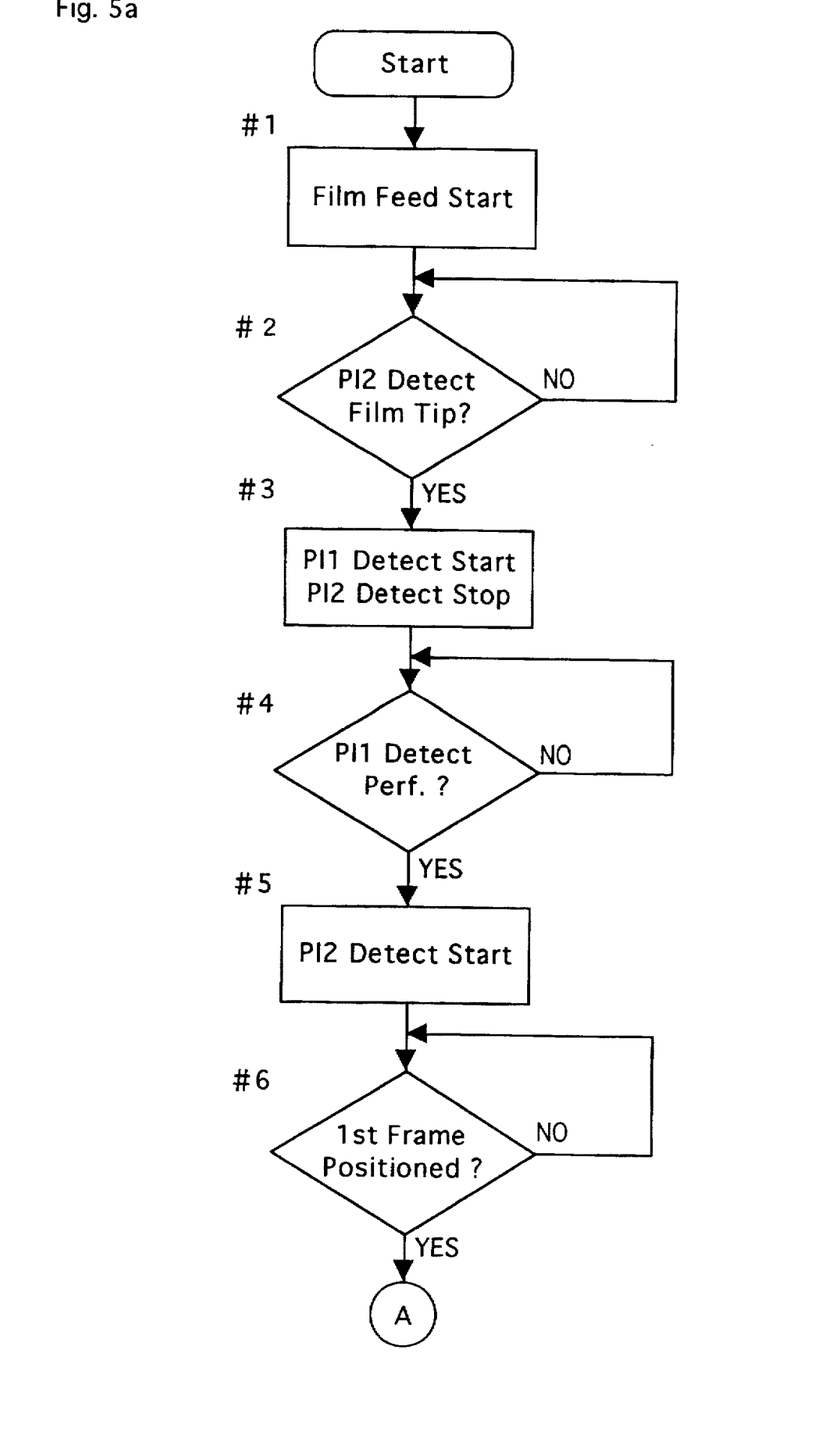
FIG. 5a and FIG. 5b are a flow chart showing the operation of the important parts of the film conveyance device of the camera of FIG. 1.
Figure 5B:
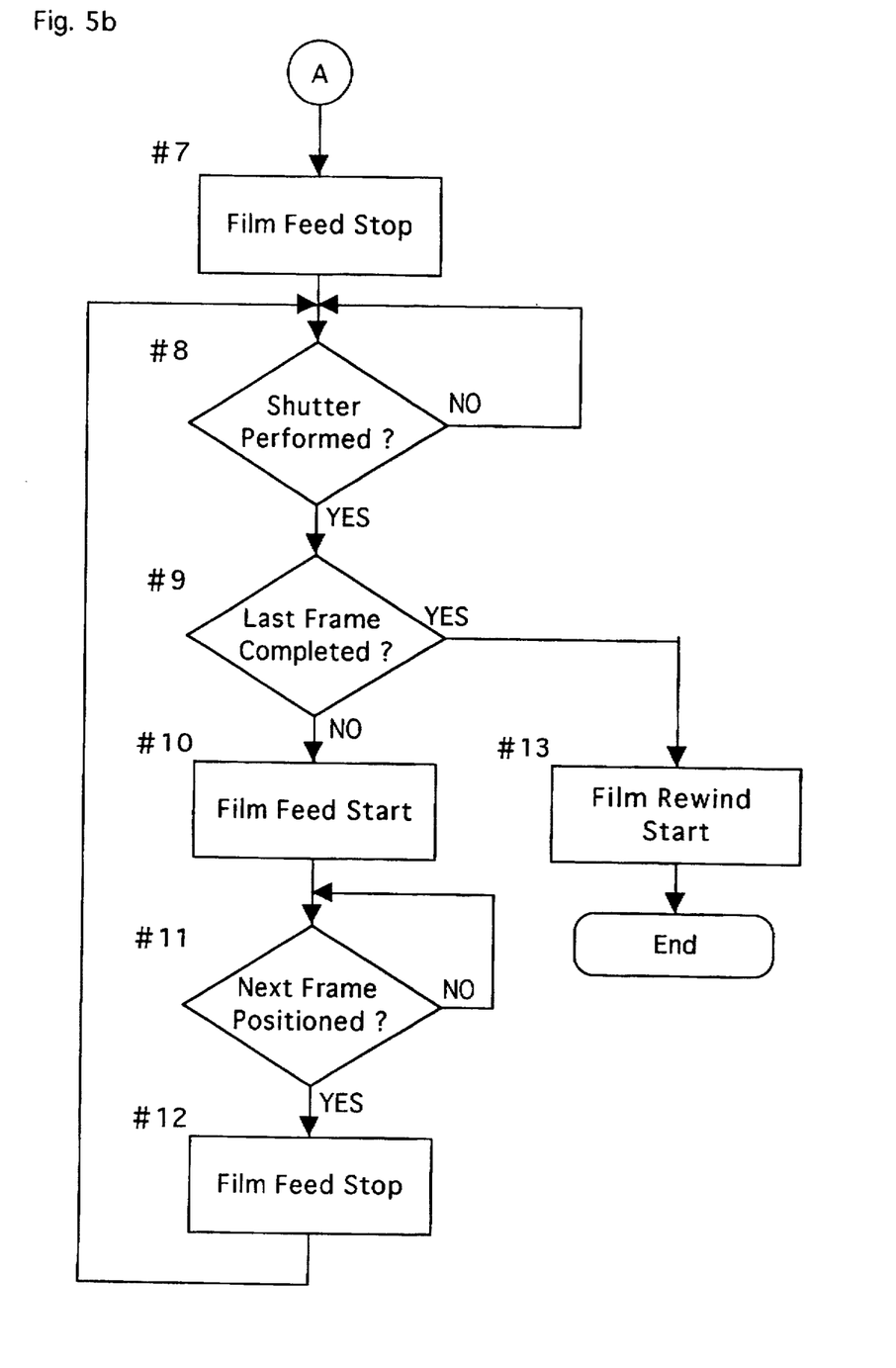

Fig. 5 is a flow chart showing the operation of the important parts of the film conveyance device of the camera shown in FIG. 1.

First, film cartridge 10 is placed in cartridge bay 23 in the camera body. When the cover to cartridge bay 23 is closed, the light blocking door of film cartridge 10 is opened, and feeding of film 4 in the forward direction is begun in step #1. At this point, when spool 10a of film cartridge 10 is rotated via motor 24, the drive mechanism and the forked axle, film 4 is fed out from the film inlet/outlet of film cartridge 10.

Figure 6A:
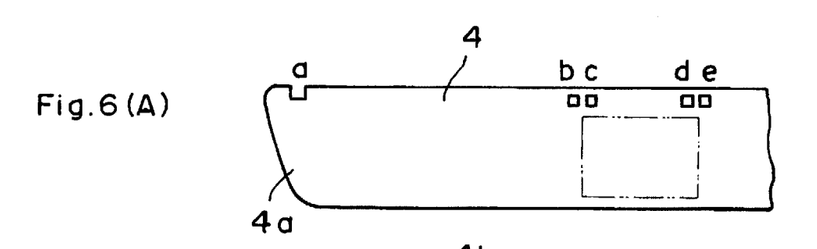
Figure 6B:
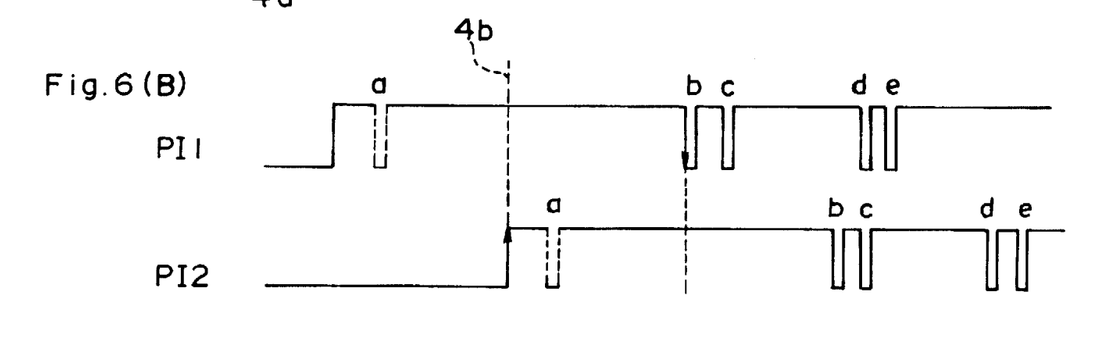

In step #2, detection is performed only by photointerrupter PI2 until the tip of film 4 reaches photointerrupter PI2. In other words, as shown in FIG. 6, the part detected by photointerrupter PI1 before the closed-off area at the tip of film 4 is detected by photointerrupter PI2 after notch 5 passes by photointerrupter PI1 is ignored (the part to the left of dashed line 4b). For example, if the number of detection signal pulse variations has been added together, the sum may be reset to zero, or detection by photointerrupter PI1 may be begun at the point in time indicated by dashed line 4b.

In step #3, detection is begun by photointerrupter PI1 that notch 5 has passed by, and detection by photointerrupter PI2, which notch 5 has not yet passed by, is stopped.

In step #4, when photointerrupter PI1 detects perforation 3, and thereby confirms that notch 5 has passed by photointerrupter PI2, detection by photointerrupter PI2 is resumed in step #5.

In step #6, it is determined whether film 4 has been fed so that the first frame is positioned at the position at which photo-taking is possible, i.e., so that photo image area 1 of film 4 is located behind photo taking lens unit 22. This determination is carried out by photointerrupter PI1, which consists of a sensor, detecting perforation 3 that corresponds to the first photo image area 1 and by photointerrupter PI2 detecting perforation 2 that corresponds to the first photo image area 1.

Where it is determined in step #6 that film 4 has not been fed out to the position at which photo-taking is possible, film feeding is continued until the photo-taking possible position is reached, and when the first photo image area 1 reaches the photo-taking possible position, the film feeding operation is stopped in step #7. Here, when a third detection pulse is input from photointerrupter PI1 and a second detection pulse is input from photointerrupter PI2, film conveyance control means 8 outputs a stop signal for motor 24 to the motor drive circuit of drive means 9. Through this operation, photo image area 1 of film 4 becomes positioned at the prescribed position behind photo lens unit 22, and the intended photo image may be exposed onto photo image area 1 of film 4 via photo-taking lens unit 22 by releasing the shutter.

When it is confirmed in step #8 that said shutter operation for the first frame has been performed, it is determined in step #9 whether or not photo-taking as to the last frame was completed, by having film conveyance control means 8 compare the number of frames in film 4 as to which photo-taking was possible and the number of frames actually exposed. If photo-taking as to the last frame was not completed, winding of film 4 is begun in step #10. This winding operation is performed via rotation of spool 10a of film cartridge 10 and winding spool 28 by means of motor 24 and the drive mechanism. In step #11, it is determined whether or not the next photo image area 1 on film 4 is in the photo-taking possible position by determining whether or not perforations 2 and 3 were detected by photointerrupters PI1 and PI2, or in other words, whether or not perforations were detected twice by each photointerrupter. If it was determined in step #11 that perforations were not detected twice, feeding and winding of film 4 are continued until perforations are detected twice. If it was determined in step #11 that perforations were detected twice, it is determined that film 4 is in the photo-taking possible position, and feeding and winding of film 4 are stopped in step #12. Through this operation, photo image area 1 of film 4 comes to be positioned behind photo-taking lens unit 22, and the next photo image may be exposed by releasing the shutter. By proceeding to step #9 after the completion of step #12, and then repeating steps #8 through #12, the third photo image and onward may be sequentially exposed onto prescribed photo image areas 1.

Where it is determined in step #9 that photo-taking as to the final frame has been completed, rewinding of film 4 is carried out in step #13. This operation to rewind film 4 is carried out via reverse rotation of spool 10a of film cartridge 10 and winding spool 28 by means of motor 24 using the drive mechanism, until film 4 is completely rewound into film cartridge 10.

Therefore, because the positional relationship between notch 5 and perforations 2 and 3 designed for new systems, notch 5 is included in the area for which detection signals are ignored. As a result, if photointerrupters PI1 and PI2 are inconsistent in their detection of notch 5 at the tip of the film when film 4 is fed forward, the detection result from photointerrupters PI1 or PI2 does not cause erroneous operation.

Embodiment 1 includes photointerrupters PI1 and PI2, and positioning of photo image areas 1 was performed via detection by these two photointerrupters PI1 and PI2, but photointerrupter PI2 may be used only for the purpose of excluding the detection of the film tip by photointerrupter PI1 and detection of perforations 2 and 3 may be performed only by photointerrupter PI1. In this case as well, a prescribed photo image area 1 of film 4 may be accurately positioned behind photo-taking lens unit 22 without the risk of erroneous operation caused by photointerrupter PI1.

Embodiment 2

In embodiment 2, a construction is used in which sensors other than optical sensors as used in embodiment 1 described above are used in order to ignore the detection of the area at the tip of the film, which may give rise to erroneous operation.

Figure 7A:
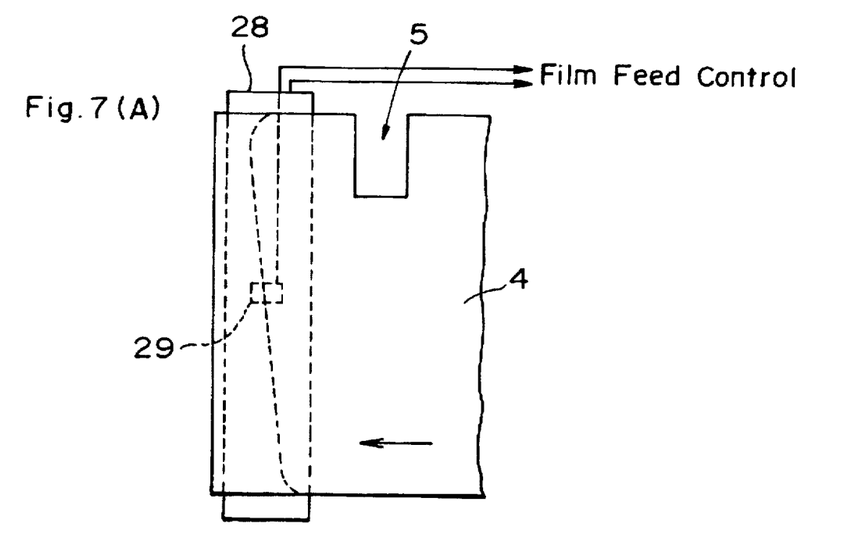
Figure 7B:
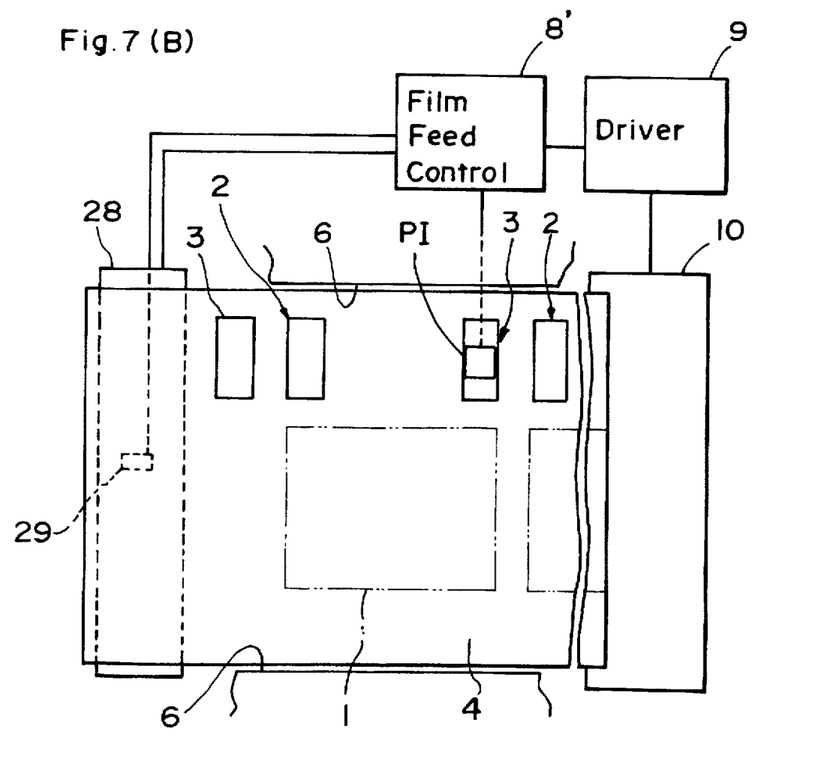

FIG. 7(A) is an illustration showing the construction of the important parts showing the situation in which the film is wound around a winding member in the camera of embodiment 2, while FIG. 7(B) is a simplified illustration showing the construction of the important parts as well as the control block of the film conveyance device of the camera. Members that have the same effects as those in FIGS. 1 through 4 are given the same numbers, and explanations thereof are omitted.

In FIG. 7(A) and FIG. 7(B), photointerrupter PI that consists of a sensor to detect perforation 3 is located in conveyance path 6 of film 4. This photointerrupter PI is located in film conveyance path 6 at a position facing the center of perforation 3 that comprises an opening corresponding to the back edge of photo-image area 1 during photo-taking.

The outer surface of winding spool 28 and film presser 29 comprise conducting members, and initially they are in contact such that current may flow from one to the other. The conductivity between the two members is blocked by film 4, an insulating member, between winding spool 28 and film presser 29.

Photointerrupter PI as well as the outer surface of winding spool 28 and film presser 29 are each connected to film conveyance control means 8' via signal lines. Film conveyance control means 8' is connected via a signal line to drive means 9 comprising a film conveyance drive circuit, motor, etc., and based on signals from photointerrupter PI as well as the surface of winding spool 28 and film presser 29, comprising a second sensor, film conveyance control means 8' performs control as to film feeding by having drive means 9 either rotate or stop the rotation of spool 10a of film cartridge 10 such that photo image areas 1 of film 4 are sequentially conveyed to a prescribed position. Specifically, it ignores sensor output until the outer surface of winding spool 28 and film presser 29, comprising the second sensor, detect the closed-up area at the tip of film 4, or namely, the detection by photointerrupter PI, comprising a first sensor, up to that point in time, and controls drive means 9 using the subsequent sensor output such that photo image areas 1 of film 4 are sequentially conveyed to a prescribed position. As described above, feeding control as to film 4 is carried out based on the detection by photointerrupter PI of perforation 3.

Figure 8A:
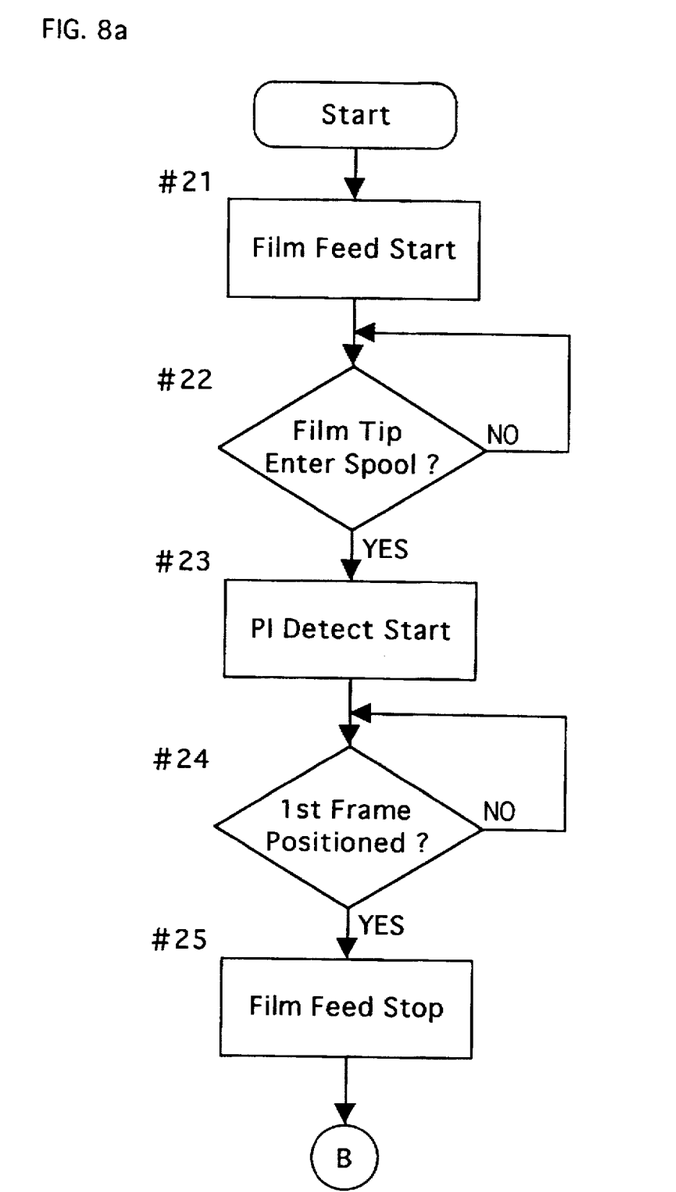
FIG. 8a and FIG. 8b are a flow chart showing the operation of the important parts of the film conveyance device of the camera of FIG. 7.
Figure 8B:
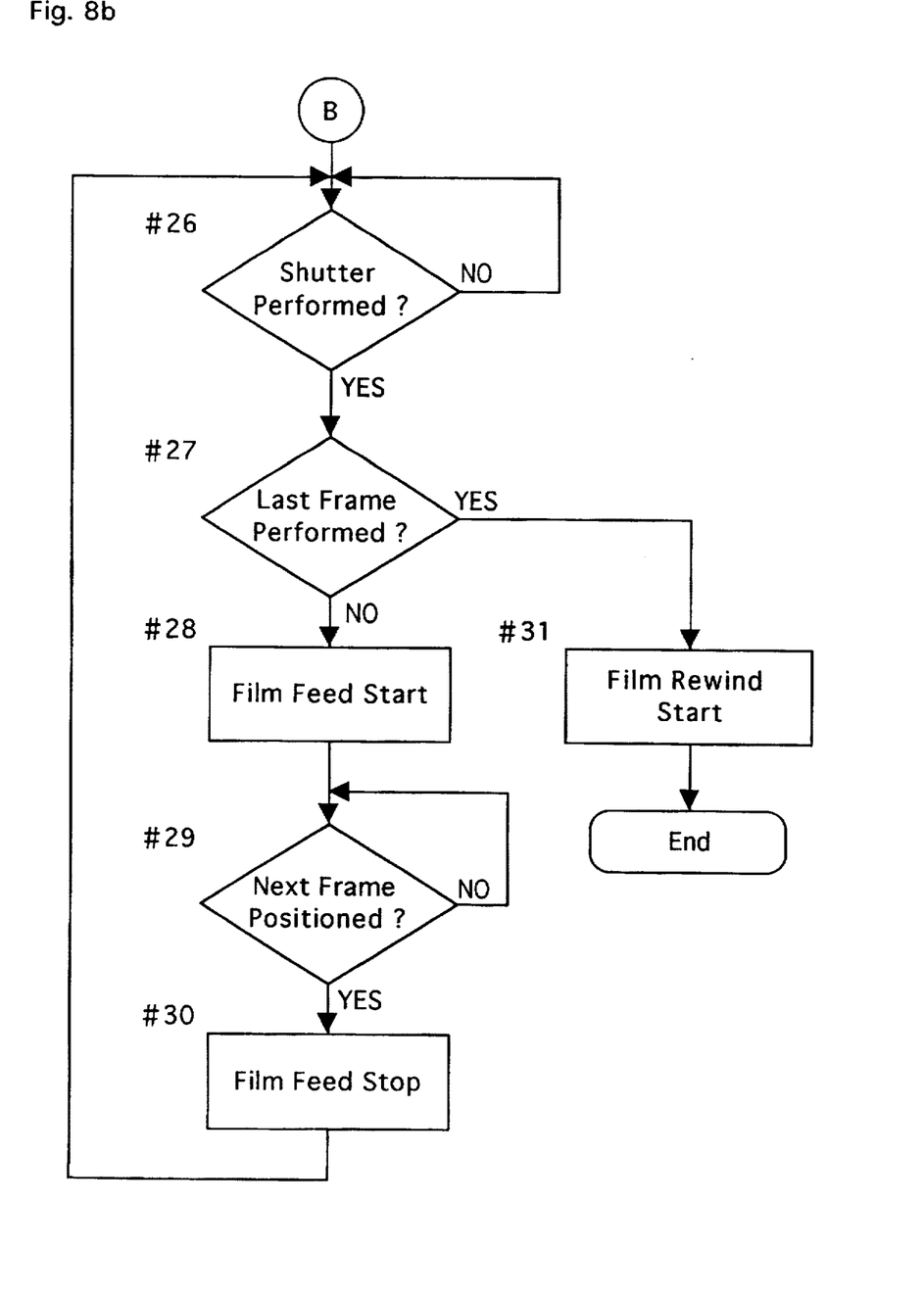

FIG. 8 is a flow chart showing the operation of the important parts of the film conveyance device of the camera shown in FIGS. 7A and 7B.

First, film cartridge 10 is placed in cartridge bay 23 in the camera body. When the cover to cartridge bay 23 is closed, the light blocking door of film cartridge 10 is opened, and feeding of film 4 in the forward direction is begun in step #21. At this point, when spool 10a of film cartridge 10 is rotated via motor 24, the drive mechanism and the forked axle, film 4 is fed out from the film inlet/outlet of film cartridge 10.

Feeding of film 4 in the forward direction is continued without causing photointerrupter PI to perform detection until the tip of film 4 enters the area between winding spool 28 and film presser 29 in step #22. In other words, detection by photointerrupter PI, after notch 5 has passed by and until the tip of film 4 reaches winding spool 28, is ignored.

After notch 5 has passed by, detection by photointerrupter PI is begun in step #23. In step #24, it is determined whether or not film 4 has been fed such that the first frame may be positioned at the photo-taking possible position, or namely, whether photo image area 1 of film 4 may be positioned behind photo-taking lens unit 22. This determination is carried out by photointerrupter PI detecting perforation 3 that corresponds to the first photo image area 1.

Where it is determined in step #24 that film 4 has not been fed to the photo-taking possible position, film feeding is continued until the photo-taking possible position is reached, and when the first photo image area 1 reaches the photo-taking possible position, the film feeding operation is stopped in step #25. Here, when a third detection pulse is input from photointerrupter PI, film conveyance control means 8' outputs a stop signal for motor 24 to the motor drive circuit of drive means 9. Through this operation, photo image area 1 of film 4 becomes positioned at the prescribed position behind photo-taking lens unit 22, and the intended photo image may be exposed onto photo image area 1 of film 4 via photo-taking lens unit 22 by releasing the shutter.

When it is confirmed in step #26 that said shutter operation as to the first frame has been performed, it is determined in step #27 whether or not photo-taking as to the last frame has been completed by having film conveyance control means 8' compare the number of frames in film 4 as to which photo-taking was possible and the number of frames actually exposed. If photo-taking as to the last frame has not been completed, winding of film 4 is begun in step #29. In step #29, it is determined whether or not the next photo image area 1 on film 4 is in the photo taking possible position by determining whether or not perforations 3 and 2 were detected, or in other words, whether or not perforations were detected twice. Where it was determined in step #29 that perforations were not detected twice, feeding and winding of film 4 are continued until perforations are detected twice. Where it was determined in step #29 that perforations were detected twice, it is determined that film 4 is in the phototaking possible position, and feeding and winding of film 4 are stopped in step #30. Through this operation, photo image area 1 of film 4 comes to be positioned behind photo-taking lens unit 22, and the next photo image may be exposed by releasing the shutter. By proceeding to step #27 after the completion of step #30, and then repeating steps #26 through #30, the third photo image and onward may be sequentially exposed to prescribed photo image areas 1.

Where it is determined in step #27 that photo-taking as to the final frame has been completed, rewinding of film 4 is carried out in step #31. This operation to rewind film 4 is carried out via reverse rotation of spool 10a of film cartridge 10 and winding spool 28 by means of motor 24 and the drive mechanism, until film 4 is completely rewound into film cartridge 10.

Therefore, because photointerrupter PI that detects the openings and the closed-off areas is located in film conveyance path 6 at a position facing perforation 3, which corresponds to a prescribed area of photo image area 1 during photo-taking, as well as due to film conveyance control means 8' that performs control such that the photo image areas may be sequentially fed to the photo-taking possible position using the sensor output after precluding detection by photointerrupter PI up to the point in time where the blocking of the conductivity between the outer surface of winding spool 28 and film presser 29 via the tip of the film is detected, even if film 4 becomes skewed widthwise during the feeding of film 4 and detection of notch 5 at the tip of the film is inconsistent, because notch 5 is included in the detection ignored area, photointerrupter PI does not cause erroneous operation. As a result, a prescribed photo image area 1 of film 4 may be accurately positioned behind photo-taking lens unit 22 using the detection output from photointerrupter PI.

In embodiment 2 described above, photointerrupter PI, consisting of a first sensor to detect perforation 3, is used for feeding control for film 4, but photointerrupter PI', consisting of a first sensor to detect perforation 2 instead of perforation 3, may be used for feeding control for film 4. Further, while the tip of the film is detected based on where it is on winding spool 29 in embodiment 2 described above, the location of the sensor to detect the tip of the film may be any location that the tip of the film passes after notch 5 has passed by the first sensor: it may be located on the side that faces the edge of the film that is opposite to the side where notch 5 and perforations 2 and 3 are formed.

In embodiments 1 and 2, photointerrupters are used for the detection of perforations 2 and 3. However, said detection may be carried out using photoreflectors or any other sensors that come into contact with the film.

Figure 9:
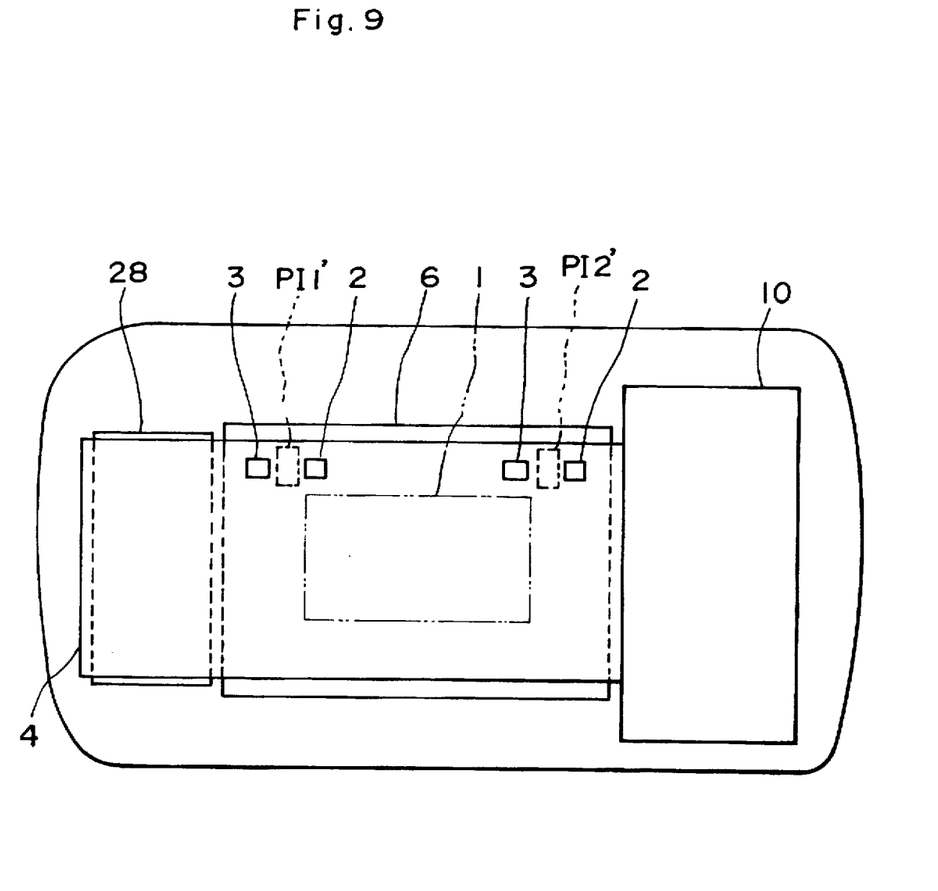
FIG. 9 is an illustration showing the construction of the important parts of the camera of embodiment 3 of the present invention as seen from the back of the camera.

In embodiment 1, photointerrupters PI1 and PI2 are located such that they face perforations 3 and 2, respectively, during photo-taking, and in embodiment 2, photointerrupter PI is located such that it faces perforation 3 during photo-taking. However, photointerrupters PI1' and PI2' may be located in film conveyance path 6 at positions that correspond to the position of photo image area 1 during phototaking and at which the photointerrupters face the parts between perforations 3 and 2 that are close to each other during photo-taking, as in embodiment 3 shown in FIG. 9. In this case, although the feeding of the film is stopped based on the detection by photointerrupters PI1' and PI2' of the change from an opening to a closed-off area, the film continues to move a short distance and comes to a complete halt at a position at which photointerrupters PI1' and PI2' each face the area between perforations 3 and 2 that are close to each other. Similarly, in embodiments 1 and 2 described above, although the feeding of the film is stopped based on the detection by the photointerrupters (or photointerrupter) of the change from a closed-off area to an opening, the film continues to move a short distance and comes to a complete halt at a position at which the photointerrupters (or photointerrupter) each face the center of a perforation.

In embodiments 1 through 3, perforations 2 and 3 as well as notch 5, which are used for the purpose of detection, are located on the upper edge of film 4 and the sensors are located so as to face them. However, these perforations and notch may be located on the lower edge of film 4, and the effect of the embodiments described above may be similarly obtained in this case as well.

While the explanations above refer to an example in which the present invention is applied in a camera, the application of the present invention is not limited to said device only. Needless to say, the present invention may be applied in a film reader that reads, using a CCD, the images on the film placed in it and displays the images on a display device such as a CRT or cathode-ray tube in the same manner as in the embodiments described above.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for use of a film having perforations on the edge thereof, and having a film tip, said apparatus comprising:
   a feeding means for feeding the film;
   a detecting means for detecting perforations formed on the edge of the film and generating an output;
   a control means for controlling the feeding means based on the output from the detecting means;
   a judging means for judging whether or not the tip of the film has passed in front of the detecting means; and
   an inhibiting means for inhibiting the operation of said detecting means between a beginning of film feeding and the passing of the film tip in front of the detecting means.

2. An apparatus as claimed in claim 1, wherein said judging means includes a sensor located to sense the presence of the film on the downstream side of the detecting means in the direction of film feeding, and said judging means inhibits the operation of said detecting means until the detection of the output from said sensor.

3. An apparatus as claimed in claim 1, further comprising a spool and a film presser for winding the film around the spool, the spool and the film presser being electrically connected to the judging means, wherein said judging means judges that the tip of the film has passed in front of the detecting means when the conductivity between the spool and the film presser is blocked by the film.

4. An apparatus as claimed in claim 1, further comprising a counting means for counting a number of perforations based on the output from the detecting means, and said control means controls the feeding means to stop an image area of the film in a predetermined position.

5. An apparatus for use of a film stored in a cartridge, said apparatus comprising:
   a spool;
   a feeder which feeds the film from the cartridge toward the spool;
   a sensor which is located to sense the presence of the edge of the film and outputs a signal corresponding to apertures formed on the film;
   a control means for stopping the operation of the feeder when a change in the output of the sensor is detected;
   a detector which detects the arrival of the film at the spool; and
   a preventing means for preventing the operation of the sensor between a beginning of film feeding and the detection by the detector of an arrival of the film tip at the spool.

6. An apparatus as claimed in claim 5, wherein said detector includes a first conductive member provided on the spool and a second conductive member provided on a film presser for winding the film on the spool and said detector detects the arrival of the film at the spool when the conductivity between the spool and the film presser is blocked by the film.

7. A camera for use of a film stored in a cartridge and having perforations on the edge thereof, said camera comprising:
   a feeding means for feeding out the film from the cartridge;
   a first sensor which is located to sense the presence of the film on the upstream side of a photo-taking position in the direction of film feeding;
   a second sensor which is located to sense the presence of the film on the downstream side of the photo-taking position in the direction of film feeding;
   a first preventing means which prevents a detecting operation by the first sensor between a beginning of film feeding and a detection of a change in the output of the second sensor;
   a second preventing means which prevents a detecting operation by the second sensor between a detection of a change in the output of the second sensor and the detection of a change in the output of the first sensor; and
   a control means for stopping the operation of the feeding means when a change in the output of both the first and second sensors is detected.

8. A method for detecting perforations on a film, comprising the steps of:
   feeding film from a film cartridge past a deactivated first detector located at a first location;
   detecting a tip of the film using a second detector located at a second location, wherein the second location is downstream from the first location in the direction of film travel;
   activating the first detector and deactivating the second detector after the second detector detects the tip of the film; and
   detecting a perforation in the film using the first detector.

* * * * *